(12) United States Patent
Hutten et al.

(10) Patent No.: US 11,513,656 B2
(45) Date of Patent: Nov. 29, 2022

(54) DISTALLY SHARED, AUGMENTED REALITY SPACE

(71) Applicant: Wormhole Labs, Inc., Huntington Beach, CA (US)

(72) Inventors: Curtis Hutten, Laguna Beach, CA (US); Robert D. Fish, Tustin, CA (US)

(73) Assignee: Wormhole Labs, Inc., Sherman Oaks, CA (US)

( * ) Notice: Subject to any disclaimer, the term of this patent is extended or adjusted under 35 U.S.C. 154(b) by 0 days.

(21) Appl. No.: 17/217,737

(22) Filed: Mar. 30, 2021

(65) Prior Publication Data

US 2021/0216191 A1 Jul. 15, 2021

Related U.S. Application Data

(63) Continuation of application No. 16/372,209, filed on Apr. 1, 2019, now Pat. No. 10,983,662.

(51) Int. Cl.
*G06T 19/00* (2011.01)
*G06F 3/04815* (2022.01)
*A63F 13/25* (2014.01)

(52) U.S. Cl.
CPC .......... *G06F 3/04815* (2013.01); *A63F 13/25* (2014.09); *G06T 19/006* (2013.01); *A63F 2300/30* (2013.01); *A63F 2300/8082* (2013.01); *G06T 2219/024* (2013.01)

(58) Field of Classification Search
None
See application file for complete search history.

(56) References Cited

U.S. PATENT DOCUMENTS

| 8,814,691 | B2 | 8/2014 | Haddick et al. |
| 10,200,654 | B2 | 2/2019 | Szymczyk et al. |
| 2011/0004888 | A1 | 1/2011 | Srinivasan et al. |
| 2011/0221771 | A1 | 9/2011 | Cramer et al. |
| 2011/0310120 | A1 | 12/2011 | Narayanan |
| 2012/0210254 | A1 | 8/2012 | Fukuchi et al. |

(Continued)

FOREIGN PATENT DOCUMENTS

WO 2019005322 A1 1/2019

OTHER PUBLICATIONS

Explore Sinespace, https://sine.space/explore/, Mar. 26, 2019, 1 page.

(Continued)

*Primary Examiner* — Robert J Craddock
(74) *Attorney, Agent, or Firm* — Fish IP Law, LLP (57) ABSTRACT

In a method facilitating connectivity between at least first and second persons contemplates utilizing one or more computer processors to instantiate a first augmented reality space that mimics a real world space physically in existence about a first person. The first augmented reality space includes at least an avatar of the first person, and a first virtual representation of at least one real world object within the first augmented reality space. Using one or more computer processors, the method provides an interface through which the second person, distal to the first person, can use a second avatar to contemporaneously occupy and enter the first augmented reality space, traverse the space, and interact with the object.

17 Claims, 6 Drawing Sheets

(56) References Cited

U.S. PATENT DOCUMENTS

| | | |
|---|---|---|
| 2012/0259744 A1 | 10/2012 | Ganesh et al. |
| 2013/0293468 A1 | 11/2013 | Perez et al. |
| 2015/0113581 A1 | 4/2015 | McArdle et al. |
| 2015/0356787 A1 | 12/2015 | Abe et al. |
| 2017/0160815 A1 | 6/2017 | Glazier et al. |
| 2017/0169610 A1 | 6/2017 | King |
| 2017/0228931 A1 | 8/2017 | Parker et al. |
| 2017/0243403 A1 | 8/2017 | Daniels et al. |
| 2020/0160345 A1* | 5/2020 | Damania ................. G06T 13/40 |

OTHER PUBLICATIONS

Forget Skype, hang up on Hangouts. Beam your 3D avatar into AR space instead, https://fellowsblog.ted.com/ready-to-liberate-computing-from-the-screen-beam-it-into-ar-space-90bfdfc8d820, Mar. 26, 2019, 12 pages.

VRChat—Developer FAQ, https://www.vrchat.net/developer-faq, 2 pages.

International Search Report and Written Opinion dated Jul. 28, 2020 for International Application No. PCT/US2020/026144, 10 pages.

* cited by examiner

DISTALLY SHARED, AUGMENTED REALITY SPACE

This application is a continuation of U.S. patent application Ser. No. 16/372,209, filed on Apr. 1, 2019. This application and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is mixed reality environments.

BACKGROUND

For many practical reasons, social media is relied upon as a way of quickly connecting with others without the inconveniences of physically traveling to the person. Although social networking connects people on many levels, social media users often feel increasingly isolated. One reason for this feeling of isolation is because of the lack of close physical interactions between linked social media users. The inventive concepts herein aim to integrate combinations of augmented reality spaces, interactive objects, and virtual reality spaces to increase the feeling of connectedness between users.

Specifically, the present invention enables individuals to enter into the augmented reality spaces of others and interact with others. By allowing individuals to portal into another person's augmented realities, and further allowing linking of additional augmented realities to the first augmented reality, individuals are able to traverse a personalized augmented reality environment and interact with one or more objects in the augmented reality space to increase a feeling of immersion.

The present invention further contemplates that users can also portal to a virtual reality space from the augmented reality space. For example, a user can portal into a multiplayer video game that the subject of the first augmented reality is participating in.

To further increase the feeling of connectedness to the subject of the augmented realities, the augmented realities herein can be curated spaces that reflect the personal tastes of the subject of the augmented reality space. Additionally, the curated space can mimic the actual physical space about the subject. For the purposes of this application, mimic can span a substantially identical copy of the space to a space with similar themes to a real-world space. In spaces with similar themes to a real-world space, for example, a user can include some personal art and similar color schemes in their augmented reality space to create a personal associated between the subject and the space.

U.S. Pat. No. 8,814,691 to Haddick teaches a social networking associated with augmented reality. Haddick, however, discloses a method that requires users to sign in through a separate website to then be inserted into an online game that is viewed through a head-mounted eyepiece. Haddick fails to allow users to enter customized augmented reality and virtual reality sub-spaces that are linked together, as contemplated by the present invention.

US Patent Application Publication No. 2011/0221771 to Cramer teaches an augmented reality-enabled distribution network that requires smart markers for participants to engage with the augmented reality space together. As with Haddick, Cramer fails to disclose an augmented reality and virtual reality hybrid system that allows participants to socialize and engage with each other in gameplay in both augmented reality and virtual reality sub-spaces. Cramer also fails to describe a linked mixed reality system that is contemplated by the presented invention.

In gaming, it is generally known that players can move between virtual spaces by teleporting. However, these game worlds are largely tied to predetermined structures, limited customization specific to the game, and linked to other preselected areas. For example, a game such as The Sims™ allows users to engage with each other in a shared virtual space with each home built and accessorized using an in-game engine. Unlike The Sims™, the inventive concept herein contemplates a highly customizable mixed reality space that can link to any number of other customized mixed reality spaces. The present invention also contemplates enabling users to tie customizable functions to their mixed reality space, including, but not limited to, functions such as polling, media linking, game linking, linking to other realities, social media functions, and authentication functions.

Haddick, Cramer, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for mixed reality systems infrastructures allow users to travel between and visit each other's personal augmented reality spaces with user customizable appearance and functionalities.

SUMMARY OF THE INVENTION

The inventive concept herein contemplates virtual reality, augmented reality, and/or mixed reality environments that are highly customizable with various interactive elements. It is contemplated that the interactive elements can be at least partially customized by an administrator of the mixed reality space. It is further contemplated that the administrator of the mixed reality space can be a subject of the mixed reality space or a third party managing the mixed reality space.

Mixed reality spaces can be layered and/or connected in any configuration. Connected mixed reality spaces can comprise any number of sub-environments. For example, a virtual depiction of Earth comprising portals to particular augmented reality spaces can be considered a primary sub-environment. Upon entering a portal, the connected mixed reality space that a user enters can be considered a secondary sub-environment. However, the inventive concept is not limited to the aforementioned embodiment.

The present invention further contemplates controlling the influx and efflux of participants in a mixed reality space. For example, authentication measures can prevent particular users from entering a virtual clubhouse while allowing others to enter the virtual clubhouse.

By enabling sub-environments to be incorporated into virtual reality and augmented reality interfaces, the currently claimed subject matter provides a non-conventional and non-routine social networking system and methods of executing the social networking system.

Various resources, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer-based scheduling system, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including allowing users to access mixed reality environments. Mixed reality environments can include any combination of virtual and augmented reality environments and can be connected to each other in any manner.

For the purposes of this application, sub-environments can comprise any one or more of an augmented reality, a virtual reality, and any other interactive media format. For example, a primary sub-environment can be a first augmented reality, and a secondary sub-environment can be a second augmented reality connected to the first through a portal.

For the purposes of this application, "portal" or any similar terms, such as "portalling" and "portalled" mean any connected between environments. Portals can be in the form of interactive objects, designated spaces, or any other form that allows a user to connect to other augmented realities and/or virtual realities.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
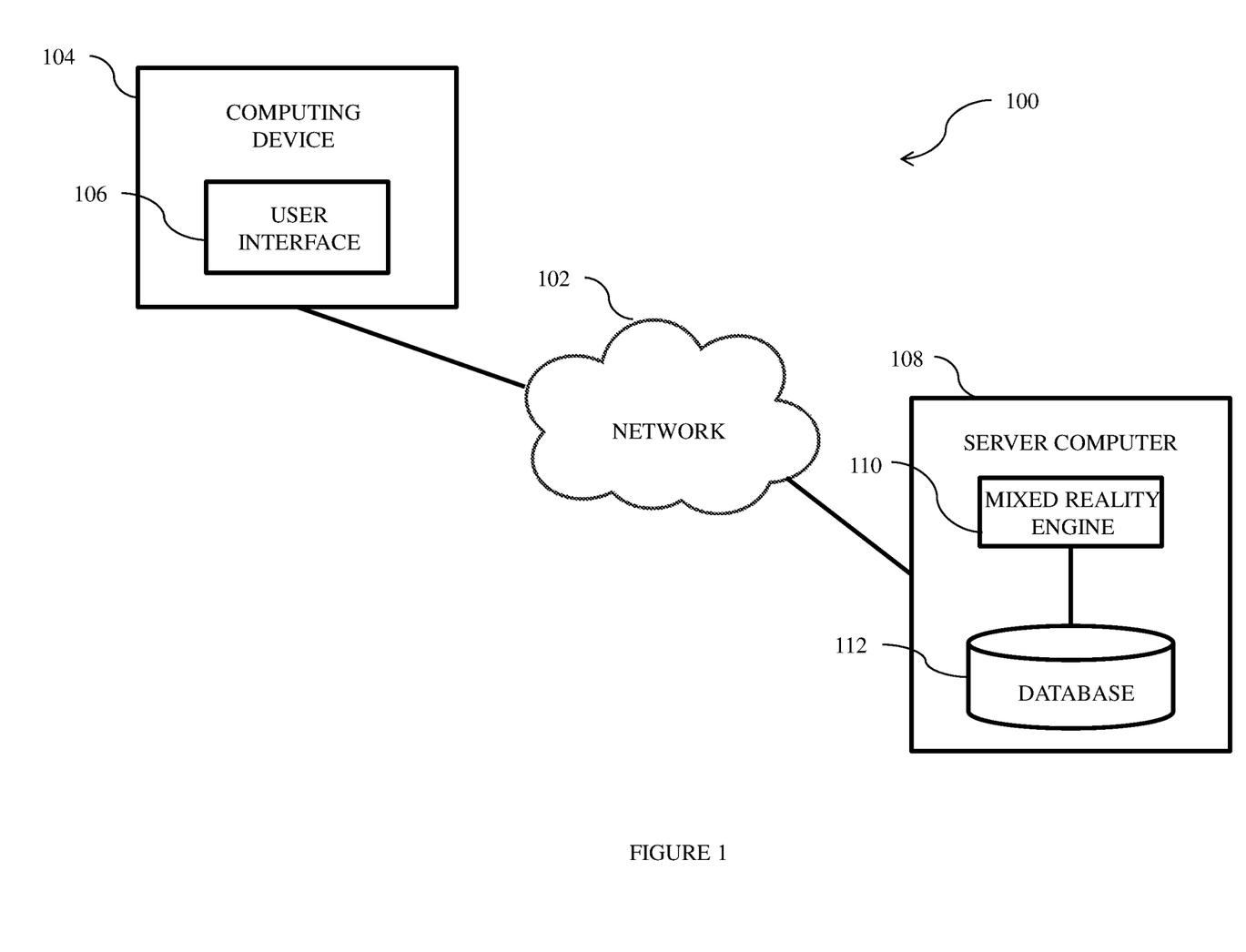
FIG. 1 is a functional block diagram illustrating a distributed data processing environment.

FIG. 1 is a functional block diagram illustrating a distributed data processing environment.

The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104, server computer 108, and any other computing devices (not shown) within distributed data processing environment 100.

It is contemplated that computing device 104 can be any programmable electronic computing device capable of communicating with various components and devices within distributed data processing environment 100, via network 102. It is further contemplated that computing device 104 can execute machine readable program instructions and communicate with any devices capable of communication wirelessly and/or through a wired connection. Computing device 104 includes an instance of user interface 106.

User interface 106 provides a user interface to mixed reality engine 110. Preferably, user interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface can be mobile application software. Mobile application software, or an "app," is a computer program designed to run on smart phones, tablet computers, and any other mobile devices.

User interface 106 can allow a user to register with and configure mixed reality engine 110 (discussed in more detail below) to enable a user to access a mixed reality space. It is contemplated that user interface 106 can allow a user to provide any information to mixed reality engine 110.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Database 112 is a repository for data used by mixed reality engine 110. In the depicted embodiment, mixed reality engine 110 resides on server computer 108. However, database 112 can reside anywhere within a distributed data processing environment provided that mixed reality engine 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

Figure 2:
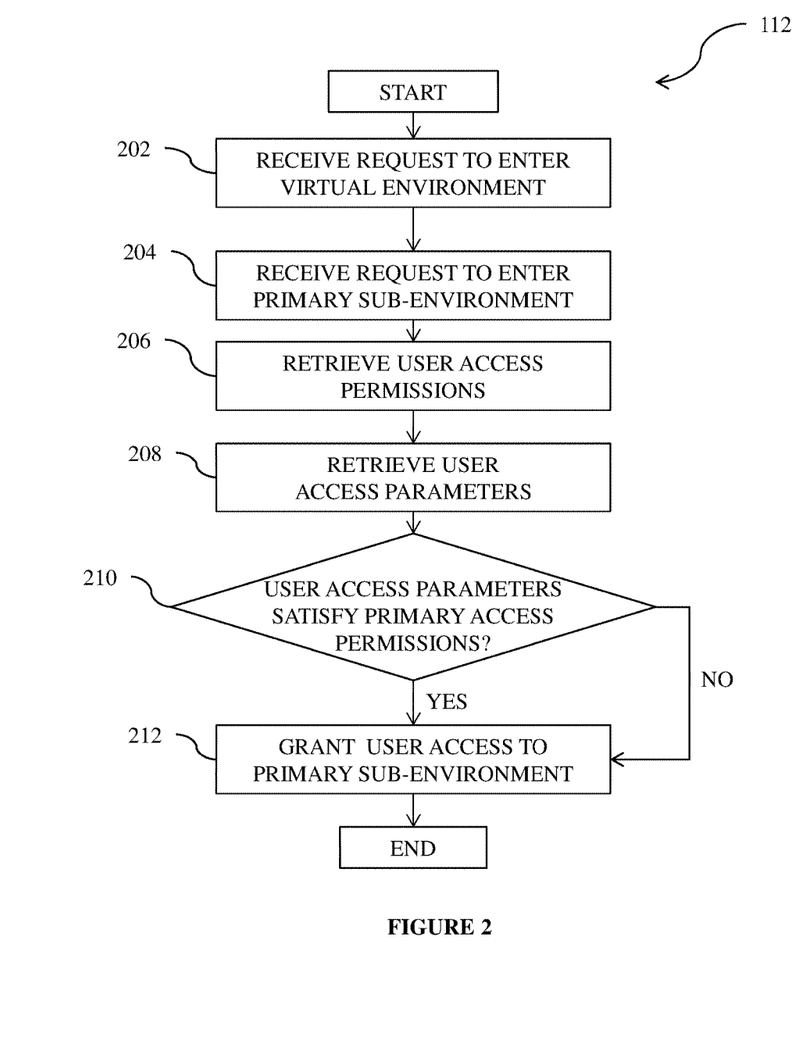
FIG. 2 is a schematic of a method of managing access to primary sub-environments in a virtual environment.

FIG. 2 is a schematic of a method of managing access to primary sub-environments in a virtual environment.

Mixed reality engine 110 receives a request to enter a virtual environment (step 202).

A virtual environment can include virtual elements and augmented reality elements. Augmented reality elements are derived from physical spaces in the real world. In preferred embodiments, the virtual environment comprises both virtual elements and augmented reality elements presented in the virtual environment. For example, the virtual environment can be a three-dimensional representation of the Earth where augmented reality elements are distributed within the three-dimensional representation of the Earth. In a more specific example, the augmented reality elements can be tied to specific individuals and contain representations of the individuals' real-world environments by any means known in the art, including 360° cameras, conventional video cameras, and stitched photos from cameras.

In a preferred embodiment, mixed reality engine 110 receives a request from a social media network user to access the virtual environments. A user can submit a request to enter a virtual environment in any manner known in the art. For example, the user can log-in to a social media network associated with the virtual environment. In another example, the user can send an access request to one or more administrators managing the virtual environment for approval. In yet another example, a user can submit biometric data, such as a fingerprint, to confirm the user's identity and send the biometric information to mixed reality engine 110.

Mixed reality engine 110 receives a user request to enter a primary sub-environment (step 204).

A primary sub-environment can be any environment within the virtual environment. In one embodiment, the primary sub-environment is an augmented reality environment. For example, a gamer streaming their game play on a streaming platform can have the gamer's real-world environment represented as an augmented reality space that can be accessed through a portal in the virtual environment.

It is contemplated that augmented reality environments can be tied to the virtual environment in any manner known in the art. For example, in a virtual environment reflecting the Earth, the augmented reality environment can be represented as the corresponding real-world location of the augmented reality environment.

In a related example, the augmented reality environment can be completely dissociated from any real-world locations. In a more specific example, the augmented reality environment can be represented as a portal present on a completely fictional planet represented next to the three-dimensional representation of the Earth.

In other embodiments, the primary sub-environment can be a purely virtual space. For example, the primary sub-environment can be represented as a portal in the virtual environment, and, upon access by a user, can send the user to a virtual world associated with a particular game.

Mixed reality engine 110 retrieves user access permissions (step 206)

User access permissions can include any rules associated with the primary sub-environment that are used to determine whether the user is granted permission to access a virtual environment or any sub-environment of the virtual environment.

Rules can include any elements that control access to an environment and the manner in which that access may be carried out. For example, rules can include, but are not limited to, accessible time frames, allowed users, allowed groups, prerequisites for access, and an extent of access for one or more users. Rules can also be applied at any time. For example, rules can be applied in real-time, such that a user that has been granted access to a primary sub-environment can lose access privileges while the user is within the primary virtual environment.

In one embodiment, mixed reality engine 110 retrieves user access permissions from database 112. It is contemplated that mixed reality engine 110 can directly store user access permission data associated with the primary sub-environment. It is also contemplated that mixed reality engine 110 can retrieve user access permissions from a third-party data store. For example, mixed reality engine 110 can retrieve user access permissions from a third-party database associated with a social network coupled to the virtual environment.

Mixed reality engine 110 retrieves user access parameters (step 208).

User access parameters can be any variable associated with a user. For example, user access parameters can include the user's location, demographic information, profile data, activity data, social connections, and any other variable associated with a user known in the art.

Mixed reality engine 110 determines whether the user access parameters satisfy the user access permissions (decision block 210).

In some embodiments, mixed reality engine 110 determines that user access parameters satisfy the user access permissions in a binary manner. For example, mixed reality engine 110 can determine that a user's access parameters meet the user access permission only if each of the user access permissions is satisfied.

In another embodiment, mixed reality engine 110 can determine that user access parameters satisfy the user access permission in a non-binary manner. In a gaming example, mixed reality engine 110 can determine weigh many factors to determine a composite score, which will allow a user access to a primary sub-environment if above a threshold composite score. In a more specific related example, the user's time played in a particular game, hours of streaming content associated with the game watched by the user, frequency of gaming sessions, and number of subscriptions to professional gaming streams associated with the game can be weighed to determine whether the user is allowed in a "clubhouse" associated with the game.

Responsive to determining that the user access parameters do not satisfy the primary access permissions, mixed reality engine 110 ends ("NO" branch, decision block 210).

Responsive to determining that the user access parameters satisfy the primary access permissions ("YES" branch, decision block 210), mixed reality engine 110 grants user access to the primary sub-environment (step 212).

Figure 3:
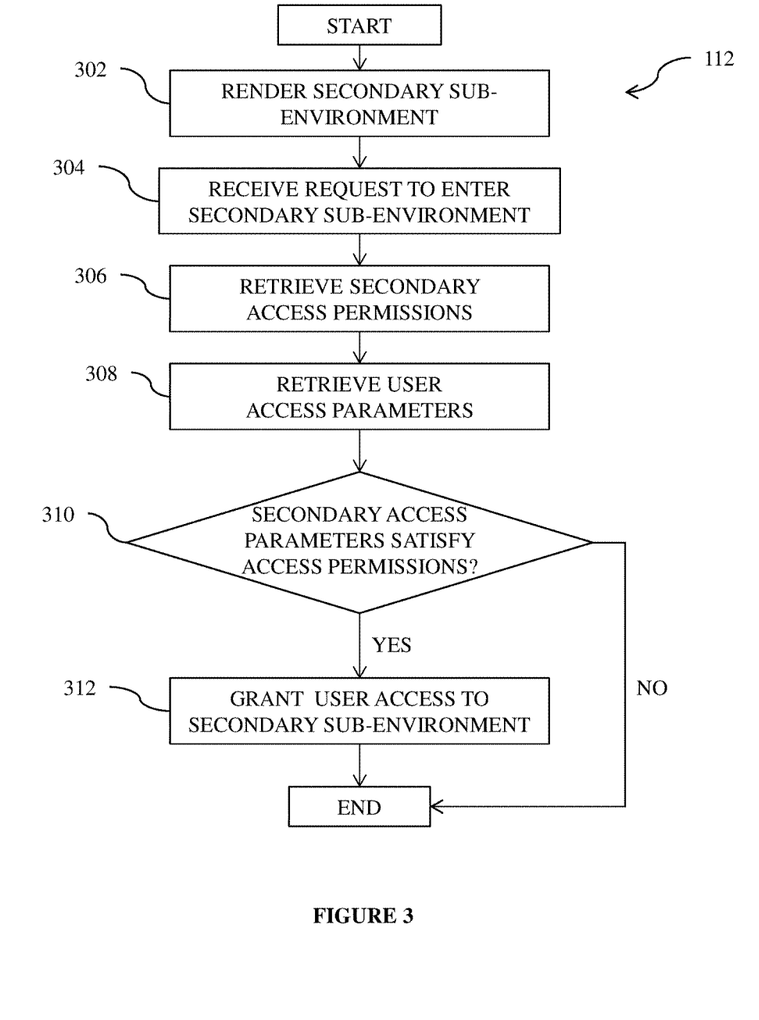
FIG. 3 is a schematic of a method of managing user access to a secondary sub-environment in a primary sub-environment.

FIG. 3 is a schematic of a method of managing user access to a secondary sub-environment in a primary sub-environment.

Mixed reality engine 110 renders a secondary sub-environment in a primary sub-environment (step 302).

A secondary sub-environment can be any environment within the primary sub-environment. In one embodiment, the secondary sub-environment is an augmented reality environment. For example, a gamer streaming their game play on a streaming platform can be the gamer's virtual environment in the game that can be accessed through a portal in the primary sub-environment. It is contemplated that sub-environments can be traversed by visiting users, which allows them to engage with the subject of the sub-environment on a deeper level. For example, a visiting user is not locked to the perspective that a streamer chooses and can, instead, traverse the streamer's room and look closer at objects outside a fixed perspective.

It is contemplated that secondary sub-environments can be tied to the primary sub-environment in any manner known in the art. For example, in a primary sub-environment that is an augmented reality representation of the gamer's real world environment, the secondary sub-environment can be represented as a portal or wormhole that allows a user to access the sub-environment through a graphical icon serving as an entrance in the augmented reality representation.

In other embodiments, the secondary sub-environment can be a purely virtual space. For example, the secondary sub-environment can be represented as a portal in the primary sub-environment, and, upon access by a user, can send the user to a virtual world associated with a particular location in a virtual game.

In yet other embodiments, the secondary sub-environment does not lead to another virtual or augmented reality space. Instead, the secondary sub-environment can be an object in the primary sub-environment that executes an action when activated. For example, the secondary sub-environment can be a virtual gift box represented in the primary sub-environment that opens and reveals a prize when a user clicks on the virtual gift box.

In another example, the secondary sub-environment can be an online poll that opens up and allows the user to select one or more choices which are displayed online.

In yet another example, the secondary sub-environment can be an object in the primary sub-environment that portals a user into an online multiplayer game that the administrator of the primary sub-environment is playing in.

In a cumulative example, a video game streamer can designate a remote control, a virtual button, and a large standing mirror in the streamer's augmented reality representation of his/her room as first, second, and third secondary sub-environments. The remote control can be designated as a selectable object that opens up a virtual screen showing the user a poll asking which game the streamer should play next. After accumulating a minimum number of votes, the poll shows that the next game the streamer will play is a particular battle royale multiplayer game. The streamer can then send a message to all users in the primary sub-environment to press the virtual button if they want a chance to play in the same server as the streamer. Following a number of users pressing the virtual button and random selection of winning users, the streamer can join a server and tell the winning users to walk into the large standing mirror to portal into the same battle royale match as the streamer.

In yet another cumulative example, five e-sports team members can each have respective primary sub-environments. Each of the team members can have four photo frames depicting their other four teammates, respectively. Further, each team member can place a virtual door in their primary sub-environments that allows users to walk into a virtual movie theater showing their current stream. Users can touch a photo frame of a particular team member to be teleported to the primary sub-environment of that team member, where the user can similarly be presented with a virtual door and four photo frames.

The embodiments and examples herein also contemplate interactivity between users in the same space. However, not all spaces are contemplated to allow users to interact with each other. For example, a space as small as a bedroom with 1000 users inside will not practically be able to simultaneously have 1000 avatars associated with the users within.

The manner in which the aforementioned examples can be executed is further described below. The steps below also contemplate additional variations of the aforementioned examples, and, for the purposes of this application, can be incorporated in any way or combination of ways described herein.

Mixed reality engine 110 receives a user request to enter a secondary sub-environment (step 304).

In a preferred embodiment, mixed reality engine 110 receives a request from a social media network user to access the secondary sub-environment. A user can submit a request to enter a secondary sub-environment in any manner known in the art. For example, the user can log-in to a social media network associated with the secondary sub-environment. In another example, the user can send an access request to one or more administrators managing the secondary sub-environment for approval. In yet another example, a user can submit biometric data, such as a fingerprint, to confirm the user's identity and send the biometric information to mixed reality engine 110.

In one embodiment, the secondary sub-environment comprises a marketplace that users access directly purchase items or enter a virtual representation of the marketplace. It is contemplated that users can purchase virtual items and real-world items from the marketplace.

In a first example, mixed reality engine 110 can present a virtual backpack in a secondary sub-environment, which, when selected by user, can give the user an option to purchase the real-world backpack for delivery to the user's home address. In another example, mixed reality engine 110 can present an upgraded armor for use in a particular video game. Upon selection and payment by a user, the upgraded armor can automatically be made available to the user in their in-game inventory. In yet another example, mixed reality engine 110 can present a gift box that is hidden in primary sub-environment. Upon a user finding and selecting the gift box, a hundred credits for a particular game that the user plays can be rewarded to the user. In this example, it is contemplated that the secondary sub-environment is not limited to always showing a secondary sub-environment. The secondary sub-environment can cause an action in the primary sub-environment to directly occur (e.g., user opens gift box in primary sub-environment and is automatically rewarded with credits).

In yet other embodiments, the secondary sub-environment requires one or more parameters to be met, which is discussed in further detail below in step 306. For example, the secondary sub-environment can only open up if the user is subscribed to the streaming channel that of the administrator of the secondary sub-environment. Here, the secondary sub-environment is a linked but separate reality from the primary sub-environment.

In another example where the secondary sub-environment is an element within the primary sub-environment (e.g., a virtual gift box that opens up to reveal a prize), the element can be activated if the user meets one or more conditions. For example, the secondary sub-environment can be a retrievable item that is only accessible to users within the primary sub-environment between the hours of 6:00 PM and 12:00 AM PST.

Mixed reality engine 110 retrieves secondary access permissions (step 306).

Similarly to step 206 of FIG. 2, user access permissions can include any rules associated with the secondary sub-environment that are used to determine whether the user is granted permission to access the secondary sub-environment or any sub-environment of the secondary sub-environment.

Rules can include any elements that control access to an environment and the manner in which that access may be carried out. For example, rules can include, but are not limited to, accessible time frames, allowed users, allowed groups, prerequisites for access, and an extent of access for one or more users. Rules can also be applied at any time. For example, rules can be applied in real-time, such that a user that has been granted access to a secondary sub-environment can lose access privileges while the user is within the secondary virtual environment.

In one embodiment, mixed reality engine 110 retrieves user access permissions from database 112. It is contemplated that mixed reality engine 110 can directly store user access permission data associated with the secondary sub-environment. It is also contemplated that mixed reality engine 110 can retrieve user access permissions from a third-party data store. For example, mixed reality engine 110 can retrieve user access permissions from a third-party database associated with a social network coupled to the virtual environment.

Mixed reality engine 110 retrieves user access parameters (step 308).

User access parameters can be any variable associated with a user. For example, user access parameters can include the user's location, demographic information, profile data, activity data, social connections, and any other variable associated with a user known in the art.

Mixed reality engine 110 determines whether the user access parameters satisfy the secondary access permissions (decision block 310).

In some embodiments, mixed reality engine 110 determines that user access parameters satisfy the user access permissions in a binary manner. For example, mixed reality engine 110 can determine that a user's access parameters meet the user access permission only if each of the user access permissions is satisfied.

In another embodiment, mixed reality engine 110 can determine that user access parameters satisfy the user access permission in a non-binary manner. In a gaming example, mixed reality engine 110 can determine weigh many factors to determine a composite score, which will allow a user access to a primary sub-environment if above a threshold composite score.

In a more specific related example, the user's time played in a particular game, hours of streaming content associated with the game watched by the user, frequency of gaming sessions, and number of subscriptions to professional gaming streams associated with the game can be weighed to determine whether the user is allowed to jump in and participate in a game that the streamer is playing in. In an additional related example, users that satisfy the secondary user access permissions for the secondary sub-environment can access the lobby of a first person shooting game that the streamer is in and play a game directly against the streamer (e.g., a battle royale game with a streamer and fans that satisfy the secondary access permissions).

It is contemplated that the presently claimed invention, advantageously allows users to participate in and interact with administrators (e.g., streamers, gamers, media personalities, etc.) associated with the secondary sub-environment. In this way, the presently claimed invention adds significantly more dimensions and complexity in social media interactions.

Responsive to determining that the user access parameters do not satisfy the secondary access permissions, mixed reality engine 110 ends ("NO" branch, decision block 310).

Responsive to determining that the user access parameters satisfy the secondary access permissions ("YES" branch, decision block 310), mixed reality engine 110 grants user access to the secondary sub-environment (step 312).

Figure 4:
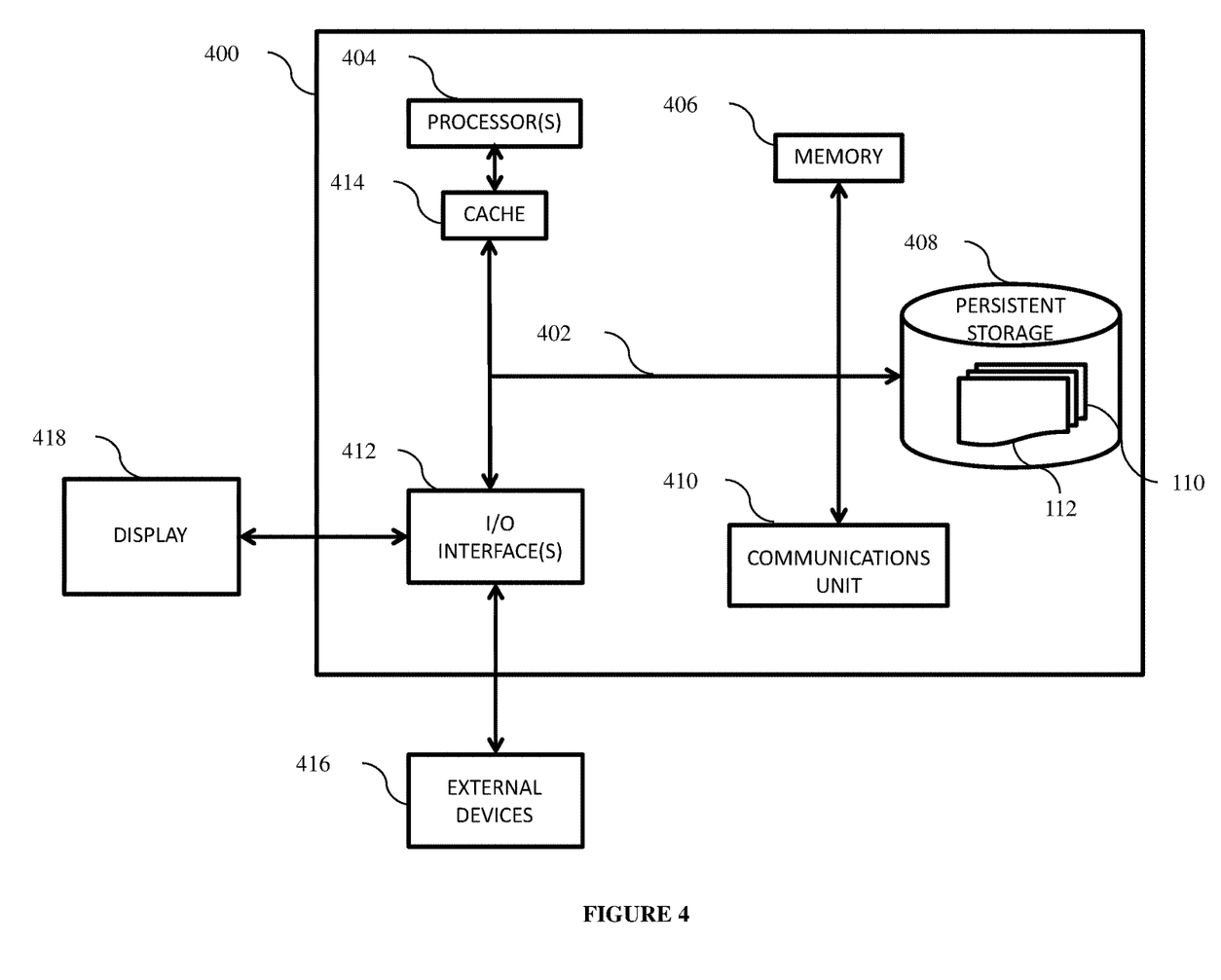
FIG. 4 depicts a block diagram of components of the server computer executing the mixed reality engine within the distributed data processing environment of FIG. 1.

FIG. 4 depicts a block diagram of components of the server computer executing mixed reality engine 110 within the distributed data processing environment of FIG. 1. FIG. 4 is not limited to the depicted embodiment. Any modification known in the art can be made to the depicted embodiment.

In one embodiment, the computer includes processor(s) 404, cache 414, memory 406, persistent storage 408, communications unit 410, input/output (I/O) interface(s) 412, and communications fabric 402.

Communications fabric 402 provides a communication medium between cache 414, memory 406, persistent storage 408, communications unit 410, and I/O interface 412. Communications fabric 402 can include any means of moving data and/or control information between computer processors, system memory, peripheral devices, and any other hardware components.

Memory 406 and persistent storage 408 are computer readable storage media. As depicted, memory 406 can include any volatile or non-volatile computer storage media. For example, volatile memory can include dynamic random access memory and/or static random access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 406 and persistent storage 408 are random access memory and a hard drive hardwired to computing device 104, respectively. For example, computing device 104 can be a computer executing the program instructions of mixed reality engine 110 communicatively coupled to a solid state drive and DRAM.

In some embodiments, persistent storage 408 is removable. For example, persistent storage 408 can be a thumb drive or a card with embedded integrated circuits.

Communications unit 410 provides a medium for communicating with other data processing systems or devices, including data resources used by computing device 104. For example, communications unit 410 can comprise multiple network interface cards. In another example, communications unit 410 can comprise physical and/or wireless communication links.

It is contemplated that mixed reality engine 110, database 112, and any other programs can be downloaded to persistent storage 408 using communications unit 410.

In a preferred embodiment, communications unit 410 comprises a global positioning satellite (GPS) device, a cellular data network communications device, and short to intermediate distance communications device (e.g., Bluetooth®, near-field communications, etc.). It is contemplated that communications unit 410 allows computing device 104 to communicate with other computing devices 104 associated with other users.

Display 418 is contemplated to provide a mechanism to display information from mixed reality engine 110 through computing device 104. In preferred embodiments, display 418 can have additional functionalities. For example, display 418 can be a pressure-based touch screen or a capacitive touch screen.

In yet other embodiments, display 418 can be any combination of sensory output devices, such as, for example, a speaker that communicates information to a user and/or a vibration/haptic feedback mechanism. For example, display 418 can be a combination of a touchscreen in the dashboard of a car, a voice command-based communication system, and a vibrating bracelet worn by a user to communicate information through a series of vibrations.

It is contemplated that display 418 does not need to be physically hardwired components and can, instead, be a collection of different devices that cooperatively communicate information to a user.

Figure 5A:
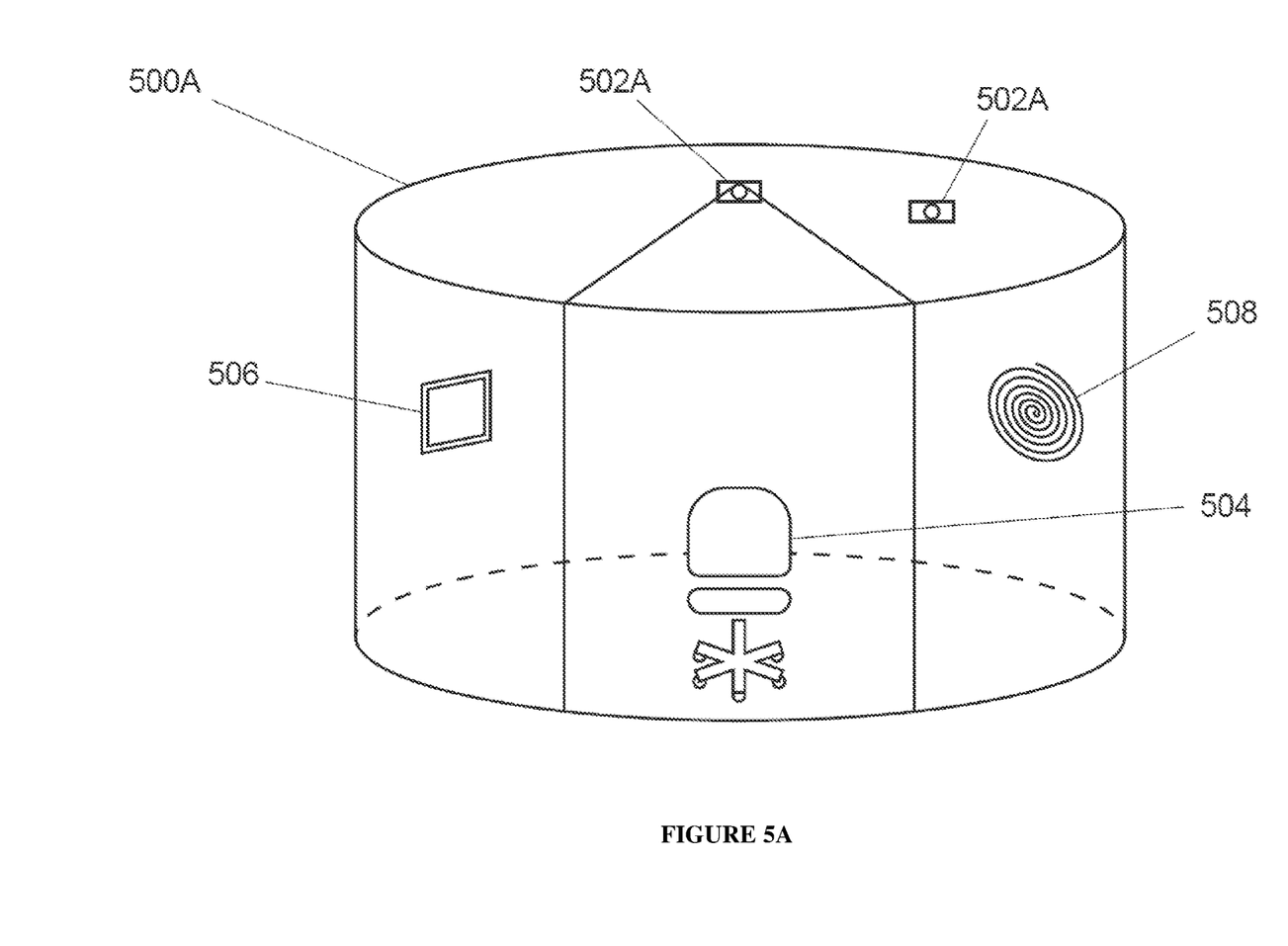
FIG. 5A depicts a first augmented reality environment about a subject.

FIG. 5A depicts a first augmented reality environment 500A tied to a first subject 504. FIG. 5A includes a first camera 502A, a first interactive object 506, and a wormhole 508.

First augmented reality environment 500A is contemplated to be a representation of the personal space of subject 504. It is contemplated that subject 504 can customize their space with objects that reflect reality and other elements that do not.

For example, first augmented reality environment 500A includes interactive object 506 which is in the form of a picture frame hung on the wall. In this depiction, interactive object 506 can be modeled after a picture frame that is physically present in the local environment of subject 504.

In another example, interactive object 506 can be any other real-world object translated into first augmented reality environment 500A, including, for example, a lamp, an action figure, a table, and a button.

In preferred embodiments, camera 502A is a combination of cameras providing multiple views of the subject and the subject's local environment. In other embodiments, camera 502A is a single 360° view camera located within the local environment of subject 504. In other embodiments, camera 502A is a single camera directed at the subject, the portions of first augmented reality 500A outside the view of camera 502A are constructed virtually.

In some embodiments, one or more machine learning techniques are used to curate at least a portion of first augmented reality environment 500A around subject 504. For example, a time series classifier can be used to tailor first augmented reality environment 500A to separate daytime schemes and nighttime schemes based on the time of day.

In another example, a linear regression analysis can be used to predict what subject 504 will do next (e.g., play a particular video game or talk about a particular topic) and tailor first augmented reality environment 500A to those predictions.

In yet another example, a supervised learning classifier can be used to identify common objects in the space around subject 504, and render subject-specific virtual objects to populate a space.

In another example, a supervised learning classifier can be used to identify pictures of friends that commonly play with subject 504 in a particular video game. Based on the identified pictures, first augmented reality environment 500A can be filled with dynamic pictures showing recent social media pictures posted publically by the friends of subject 504.

Wormhole 508 is any connection between first augmented reality environment 500A and another environment. It is contemplated that other environments can include, but are not limited to, augmented reality environments, virtual environment, media files, and websites. In preferably embodiments, however, wormhole 508 connects multiple augmented reality environments together.

Figure 5B:
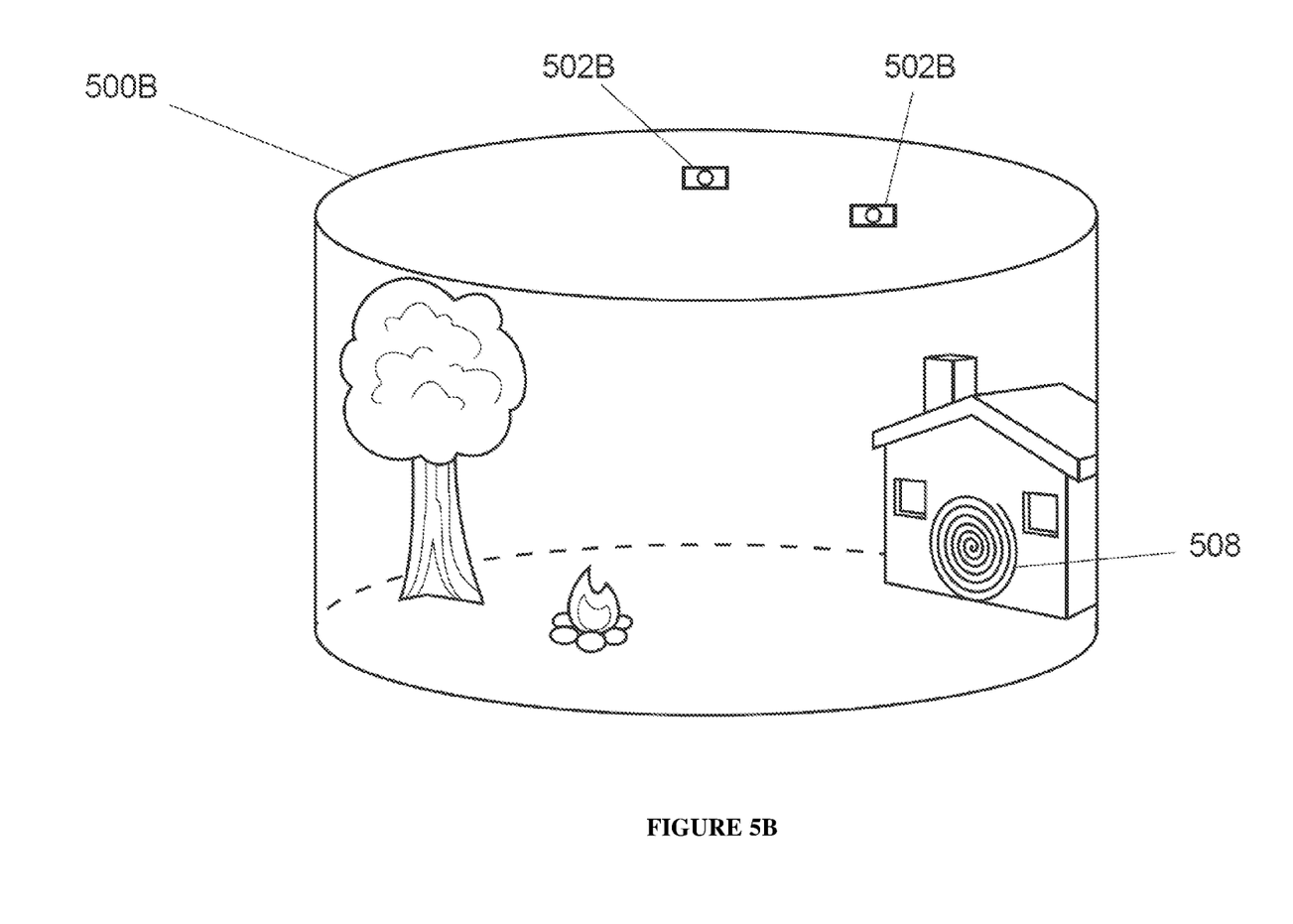
FIG. 5B depicts a second augmented reality environment connected to first augmented reality environment through a wormhole, according to embodiments of the inventive subject matter.

FIG. 5B depicts a second augmented reality environment 500B connected to first augmented reality environment 500A through wormhole 508. FIG. 5B includes a second camera 502B.

Second augmented reality environment 500B is contemplated to be a representation of an outdoor space outside of a house.

In preferred embodiments, camera 502B is a combination of cameras providing multiple views of the subject and the subject's local environment. In other embodiments, camera 502B is a single 360° view camera located within second augmented reality environment 500B. In other embodiments, camera 502B is a single camera directed at the subject, the portions of second augmented reality environment 500B outside the view of camera 502B are constructed virtually.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of facilitating connectivity between at least first and second persons, comprising:
   instantiating, by one or more computer processors, a first augmented reality space that mimics a real world space physically in existence about a first person, the first augmented reality space including at least an avatar of the first person, and a first virtual representation of at least one real world object within the first augmented reality space;

providing, by the one or more computer processors, an interface through which the first person can attribute at least one function to the first virtual representation, wherein the at least one function comprises a portal to transport users from the first augmented reality space to a virtual reality environment; and providing, by the one or more computer processors, an interface through which the second person, distal to the first person, can use a second avatar to enter the first augmented reality space, traverse the space, and interact with the first virtual representation;

transporting, upon an interaction by at least one of the first person and the second person with the first virtual representation, the first avatar and the second avatar to the virtual reality environment; and wherein the first and second avatar appear to the second person to contemporaneously occupy the first augmented reality space while the first and second avatar are within the first augmented reality space prior to transporting.

2. The method of claim 1, wherein the first avatar and the second avatar appear to the first person to contemporaneously occupy the first augmented reality space.

3. The method of claim 1, further comprising utilizing the one or more computer processors to instantiate an interaction of the second person.

4. The method of claim 1, wherein the second person has an additional augmented reality space about the second person, and wherein the first person accesses the additional augmented reality space.

5. The method of claim 1, wherein a third person has an additional augmented reality space about the third person.

6. The method of claim 1, further comprising providing a portal form the first augmented reality space to the second augmented reality space.

7. The method of claim 1, further comprising instantiating, by the one or more computer processors, a third augmented reality space that combines the first augmented reality space and the additional augmented reality space to create a combined space.

8. The method of claim 7, wherein the combined space is at least one of an overlapped space, a stacked space, and an adjacent space.

9. The method of claim 8, wherein the combined space is a traversable walk-about reality further comprising a second virtual representation of a second real world object associated with one or more functions.

10. The method of claim 1, wherein the first person is within the first augmented reality space at the same time as the second person.

11. The method of claim 1, wherein the first person is not within the first augmented reality space at the same time as the second person.

12. The method of claim 1, wherein the first augmented reality space is a shared, distal augmented reality environment.

13. The method of claim 1, further comprising receiving program instructions from the first person to designate an object in the first augmented reality environment as confidential.

14. The method of claim 13, wherein designating the object as confidential causes the object to be at least one of hidden and censored.

15. The method of claim 1, wherein the one or more functions initiates a financial transaction.

16. The method of claim 1, wherein the first and second virtual representation reflect an appearance different from real world appearances of the first and second real world object.

17. The method of claim 1, wherein the virtual reality environment comprises a video game.

* * * * *